United States Patent [19]

Schouhamer Immink et al.

[11] Patent Number: 4,807,257

[45] Date of Patent: Feb. 21, 1989

[54] APPARATUS FOR THE REGENERATION OF CHANNEL-CLOCK INFORMATION IN SYNCHRONOUS DATA TRANSMISSION AND DATA-RECOVERY CIRCUIT ARRANGEMENT COMPRISING SUCH APPARATUS

[75] Inventors: Kornelis A. Schouhamer Immink; Josephus A. H. M. Kahlman, both of Eindhoven, Netherlands

[73] Assignee: U.S. Philips Corporation, New York, N.Y.

[21] Appl. No.: 895,966

[22] Filed: Aug. 12, 1986

[30] Foreign Application Priority Data

Apr. 9, 1986 [NL] Netherlands ................ 8600889

[51] Int. Cl.$^4$ ............................................. H04L 7/00
[52] U.S. Cl. ............................................. 375/106; 375/4; 371/61
[58] Field of Search ............ 375/99, 100, 101, 102, 375/106, 110, 111, 113, 4; 371/5, 61, 64; 364/480

[56] References Cited

U.S. PATENT DOCUMENTS

| 4,295,222 | 10/1981 | Van Uffelen | 375/106 |
| 4,312,075 | 1/1982 | Murano et al. | 375/113 |
| 4,376,309 | 3/1983 | Fenderson et al. | 375/110 |
| 4,416,017 | 11/1983 | Jasper et al. | 375/99 |
| 4,558,422 | 12/1985 | Den Beste et al. | 375/106 |

FOREIGN PATENT DOCUMENTS

0109837 5/1984 European Pat. Off. .

Primary Examiner—Robert L. Griffin
Assistant Examiner—Stephen Chin
Attorney, Agent, or Firm—Thomas A. Briody; Jack E. Haken; Anne E. Barschall

[57] ABSTRACT

A sampled synchronous transmission signal Vt is represented by a series of samples J at equidistant sampling instants. A computing circuit 5 computes the positions R of the sampling instants relative to the rising edges of a virtual reference clock Cref which is phase-locked to the channel clock. For each sampling instant the position R is determined on the basis of the position R of a preceding sampling instant and a measure Q of the difference in time between the sampling interval T and the period L of the virtual reference clock Cref. From the values of the successive samples J an interpolation circuit 2 derives the positions N of the detection-level crossings by the transmission signal Vt, which crossings represent a fixed phase position of the channel clock. After each detection-level crossing the measure Q of the time difference is corrected by circuit 3 and 4, depending on the difference between the positions N and R. A data recovery circuit arrangement recovers the data depending on the values determined for the positions R.

12 Claims, 4 Drawing Sheets

APPARATUS FOR THE REGENERATION OF CHANNEL-CLOCK INFORMATION IN SYNCHRONOUS DATA TRANSMISSION AND DATA-RECOVERY CIRCUIT ARRANGEMENT COMPRISING SUCH APPARATUS

BACKGROUND OF THE INVENTION

1. Field of the Invention

The invention relates to apparatus for the regeneration of channel-clock information from a series of samples which represent the signal values of a band-limited transmission signal at equidistant sampling instants which transmission signal is synchronous with the channel clock, comprising computing means for deriving first positions of sampling instants relative to reference instants defined by fixed phase positions of a reference clock from the positions determined for previous sampling instants, detection means for detecting crossings of a detection level by the transmission signal between successive sampling instants from the values of samples corresponding to said sampling instants, interpolation means which are responsive to a level-crossing detection for determining second positions of sampling instants relative to the level crossings from the values of samples in the proximity of the detection-level crossings, and means for comparing the second positions and the first positions of sampling instants with each other.

The invention also relates to a circuit arrangement for the recovery of data represented by the sampled band-limited transmission signal, comprising apparatus for the regeneration of channel-clock information.

2. Description of the Related Art

Such apparatus and such a circuit arrangement are known from European Patent Application No. EP 0,109,837. The known channel-clock information regeneration apparatus is employed for the recovery of digital data represented by a band-limited binary synchronous data signal obtained from a magnetic-tape reader. In this apparatus the data signal is sampled at a rate which is approximately twice the channel-clock frequency. For each sample the channel-clock information regeneration apparatus determines the phase of a virtual reference clock signal as a measure of the position of the sampling instant. For each sample the measure of the position is adapted by a value corresponding to 180° by means of a cyclic counter whose counting range corresponds to a 360° phase difference. The count of the cyclic counter represents the phase of the virtual reference clock. Each time that the count exceeds a value corresponding to a phase position of 0° between two consecutive samples the data recovery circuit arrangement detects one bit of a sign which is dictated by the sign of the last sample.

Further, in response to a detection-level crossing, the phase difference between a sampling instant adjacent the detection-level crossing and the detection-level crossing is derived from the sampling values of the samples on opposite sides of the detection-level crossing. The phase difference between the channel clock and the virtual reference clock is derived from the count of the counter and the phase distance from the level crossing thus determined. The count is adapted by a value which depends on this difference. In this way it is achieved that the phase represented by the count of the cyclic counter substantially corresponds to the actual phase of the channel clock at the sampling instants.

However, such known apparatus for the regeneration of the channel clock information has the disadvantage that for reliable operation it is necessary that the sampling rate be substantially equal to twice the channel-clock frequency. If the sampling rate deviates from this value the phase difference between two successive samples no longer corresponds to 180°, so that the phase represented by the count of the cyclic counter deviates increasingly from the actual phase of the channel clock as the time interval between the sampling instants and the last detection-level crossing increases.

SUMMARY OF THE INVENTION

It is the object of the invention to provide apparatus of the type defined in the opening paragraph which for a reliable operation imposes less stringent requirement on the relationship between the sampling rate and the channel-clock frequency. According to the invention this object is achieved in that the apparatus comprises means for correcting a measure of the time difference between the period of the reference clock and the sampling interval depending on the difference between first positions and second positions which have been compared, and in that the computing means are adapted to derive the first positions depending on the measure of the time difference.

In the apparatus in accordance with the invention the correction of the measure of the time difference between the period of the reference clock and the sampling interval ensures that said difference remains in conformity with the actual difference. On the basis of this difference the positions of the sampling instants are determined, so that a relationship between sampling rate and the channel-clock frequency does not affect the reliability of the positions of the sampling instants thus determined.

In one embodiment the apparatus for the recovery of the channel-clock information is characterized in that the means for adapting the measure of the time difference comprise summing means for forming the sum of the differences between the first positions and the second positions and means for deriving the measure of the time difference from the sum of the differences.

The averaging charcter of the summation means of this embodiment has the advantage that the determination of the measure of the time difference is practically immune to occasional errors in the determination of the difference between the first measure and the second measure, which may occur, for example, as a result of interpolation errors in the determination of the first measure.

A further embodiment is characterized in that the means for adapting the measure comprise correction means for correcting the difference determined between the first position and the second position by a value corresponding to the period of the reference clock in response to a detection of a difference between the firs tposition and the second position larger than a value corresponding to half the period of the reference clock.

In this embodiment large differences between the first and the second measure are detected. These large differences generally indicate that the first position is not situated between the same samples as the second position. This results in a large difference value although the actual difference is only small. By applying a correction by a value corresponding to the interval between the reference instants the difference found between the first position and the second position is brought into conformity with the actual situation.

An embodiment which is preferred on account of its simple computing means is characterized in that the computing means for computing the first positions comprise means for adapting the previously determined first position by the measure of the time difference in response to a detection that the time interval between the preceding first position and the corresponding reference instant is smaller than the sampling interval, and means for adapting the preceding first position by a value whose magnitude corresponds to the sampling interval and whose sign is opposite to that of the measure of the time difference in response to a detection that the time interval between the preceding first position and the corresponding reference instant is larger than the sampling interval.

Suitably, a data-recovery circuit arrangement of the type defined in the foregoing is characterized in that the arrangement comprises comparison means for determining whether the values of the first positions are situated within bounds which are situated at an interval corresponding to the sampling interval from each other and counting means for counting the number of times that the values determined for the first positions between two successive detection-level crossings are situated within said bounds.

BRIEF DESCRIPTION OF THE DRAWINGS

Embodiments of the invention will now be described in more detail, by way of example, with reference to FIGS. 1 to 10, in which.

DESCRIPTION OF THE PREFERRED EMBODIMENTS

Figure 1:
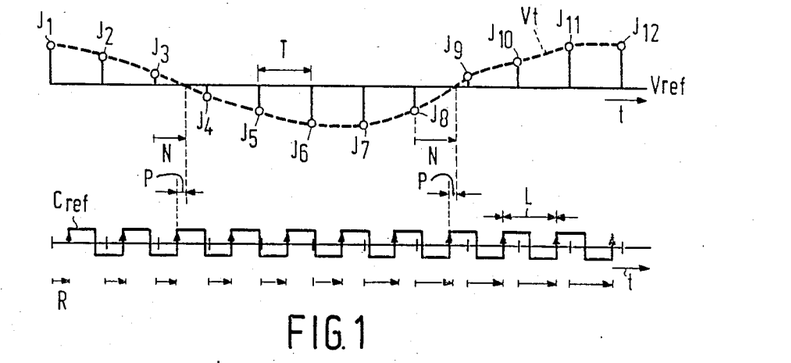
FIG. 1 shows a series of samples, the transmission signal represented by these samples, and a virtual reference-clock signal.
Figure 2:
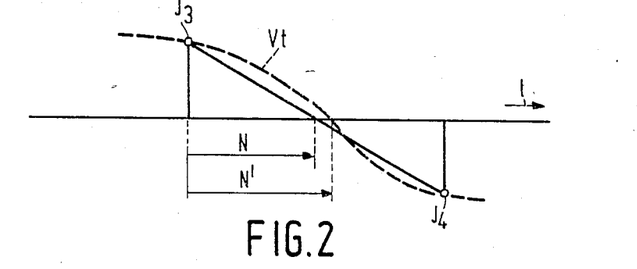
FIG. 2 shows an example of a detection-level crossing by the transmission signal.

FIG. 1 shows a series of samples J1 to J12 which are situated at equal time intervals determined by the sampling interval T from one another. The samples represent the signal values of a band-limited synchronous binary transmission signal Vt represented by a broken line in FIG. 1.

Such a transmission signal may be obtained, for example, from a read apparatus for reading digital data stored on a magnetic or optical record carrier. Such a signal may also be obtained from a transmitting station of a communication system for the transmission of digital data.

Such a transmission signal comprises a plurality of bit cells which are transmitted in synchronism with a channel clock, and which represent the transmitted digital data. For the recovery of the digital data from the series of samples it is necessary to have information on the phase position of the channel clock at the sampling instants. This information can be derived from the positions of the crossings of a detection level Vref by the transmission signal. These crossings represent fixed phase positions of the channel clock.

Hereinafter it will be described how the positions of the sampling instants are determined relative to the rising edges of a virtual reference-clock signal which is phase-locked to the channel clock. As a result of this phase locking these positions are correct measures of the phase positions of the channel clock at the sampling instants. In FIG. 1 this reference-clock signal bears the reference Cref and has a period L. The arrows R indicate the positions of the sampling instants relative to the rising edges of the reference-clock signal. The arrows N indicate the positions of the sampling instants situated just before a detectionlevel crossing relative to this detection-level crossing. Ignoring a minor error, the value of N can be determined by linear interpolation in conformity with the following relationship:

$$N = \frac{J3}{J3 - J4} \cdot T \tag{1}$$

Figure 3:
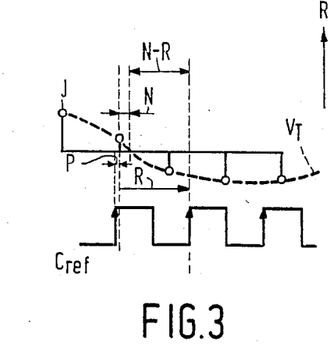
FIG. 3 shows an example of a series of samples and the reference-clock signal in the proximity of a detection-level crossing.

As is apparent from FIG. 1, the value for N defined by this relationship deviates only slightly from the actual value for the interval N' between the level crossing and the sampling instant just before the level crossing. P indicates the interval between a detectionlevel crossing and the nearest rising edge of the reference clock signal. P, N and R are related as follows:

$$P = N - R \text{ if } -\tfrac{1}{2} L \leq (N-R) \leq +\tfrac{1}{2} L \tag{2a}$$

$$P = N - R + L \text{ if } (N-R) < -\tfrac{1}{2} L \tag{2a}$$

$$P = N - R - L \text{ if } (N-R) > +\tfrac{1}{2} L \tag{2c}$$

where $L = T/Q$ in which a sampling instant is situated between a rising edge of the reference-clock signal Cref and a detection-level crossing (see FIG. 3). This results in a large difference between N and R, whilst in fact the actual interval between the sising edge and the level crossing is only small. Applying a correction by a value $\pm L$ corresponding to the period of the reference-clock signal yields a correct value for the interval between the rising edge and the detection-level crossing.

The value for R(k+1) at a sampling instant (k+1) can be derived as follows from the value of R(k) at the preceding sampling instant K, the sampling interval T and a value Q representing the difference between the period L and the sampling interval T:

$$R(k+1) = R(k) + Q \text{ if } R(k) < T$$

$$R(k+1) = R(k) - T \text{ if } R(k) > T \tag{3}$$

Figure 4:
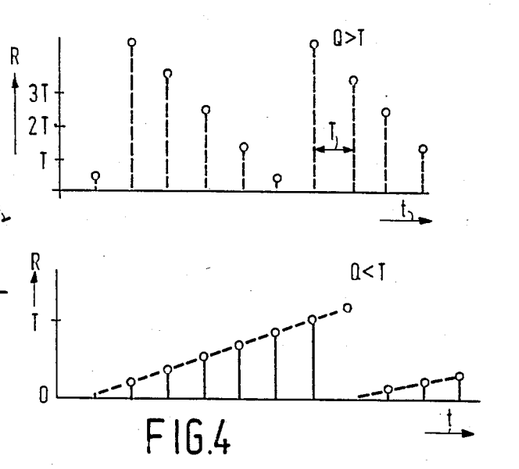
FIG. 4 shows the intervals between successive sampling instants and the reference instants.

FIG. 4 shows an example of the variation of R for a value of Q smaller than T and for a value Q larger than T. If the period L of the reference-clock signal does not correspond to the period of the channel clock this results in an increasing difference between N and R at the detection-level crossings. The difference between N and R is employed for correcting the value of Q after every detection-level crossing so as to reduce the difference between the period L of the reference-clock signal and the period of the channel clock. A satisfactory correction of Q is obtained by the set of equations (4):

$$IN(m+1) = IN(m) + P(m)$$

$$Q(m+1) = IN(m+1) + G \cdot P(m) \quad (4)$$

In these equations m is an integer representing the successive detection-level crossings, IN(k) is the iterative sum at sampling instant k of all the values of P determined previously, and G is a constant. By iteratively correcting the value of Q the deviation P will be minimized, which means that the virtual reference clock will be phase-locked to the channel clock. The rising and falling edges of the virtual reference-clock signal Cref then represent the boundaries between the bit cells and the centres of the bit cells respectively.

The intervals R between the sampling instants and the next rising edges of the reference-clock signal Vref therefore always provide a correct indication of the phase position of the channel clock at the sampling instants. The data represented by the transmission signal Vt can be recovered simply from the variation of R and the values of the samples J. This may be effected, for example, by determining the number of bit cells between successive detection-level crossings and the associated sign. Alternatively, this may be effected, for example, by determining which samples are situated nearest the centres of the bit cells and by subsequently detecting the presence of bits having signs corresponding to the signs of specific samples.

The samples situated nearest the centres of the bit cells can be selected simply from the values of R by determining for which samples the associated value of R is situated between the bounds $B1(=\frac{1}{2} Q)$ and $B2(=T+\frac{1}{2} Q)$. These bounds B1 and B2 are situated symmetrically with respect to the value $\frac{1}{2}(T+Q)$, which value corresponds to the interval between the falling edge and the next rising edge of the reference-clock signal Cref. These fallin edges indicate the centres of the bit cells of the transmission signal $V_t$.

The number of bit cells between successive detection-level crossings can be determined simply by counting the number of samples for the associated value of R is situated between $\frac{1}{2}Q$ and $\frac{1}{2}Q+T$.

However, for counting the number of bit cells it is not necessary that the bounds B1 and B2 are equal to $\frac{1}{2}Q$ and $\frac{1}{2}Q+T$ respectively. It is satisfactory if the interval between the bounds B1 and B2 corresponds to T and the bounds are situated within the range of R, i.e. if the bounds are situated between the values O and the period $L(=T+Q)$ of the virtual reference-clock signal Cref. If the bounds B1 and B2 are selected to be equal to Q and (T+Q) respectively, the number of bit cells between the successive detection-level crossings can be determined by counting a number of times that R is incremented by the value Q between the successive detection-level crossings.

Figure 5:
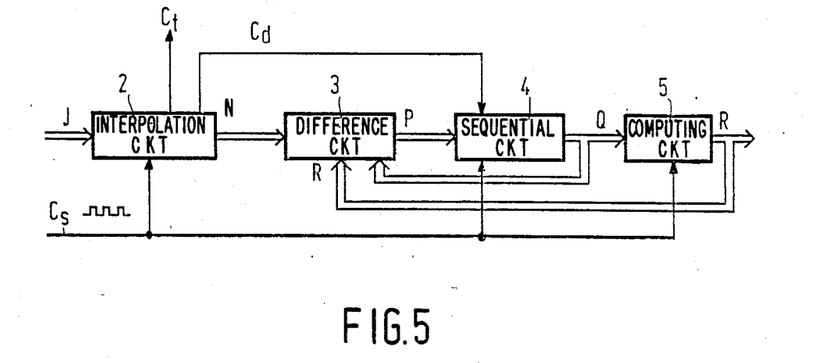
FIG. 5 shows a apparatus embodying the invention.

FIG. 5 shows apparatus 1 embodying the invention for the regeneration of clock information in the form of the intervals R between the sampling instants and the rising edges of the reference clock, which is phase-locked to the channel clock. This Figure shows an interpolation circuit 2 to which the series of samples J in the form of digital codes is applied in synchronism with a system clock signal Cs. From the successive codes the interpolation circuit 2 detects whether the detection level Vref is crossed between the sampling instants corresponding to the successive codes. In the case of such a crossing the interpolation circuit 2 derives a measure of the interval N from the successive codes in conformity with relationship (1). Moreover, the interpolation circuit 2 then generates a detection signal Cd, which indicates detection of a level crossing. The interpolation circuit further generates a logic signal CT representing the sign of the penultimate sample applied. The output signal N in the form of a digital code is applied to first inputs of a difference circuit 3. The value R also in the form of a digital code is applied to the second inputs of the difference circuit 3. A code for the value of Q is applied to third inputs of the difference circuit 3. The difference circuit 3 computes the difference P from N, R and Q in conformity with the relationships (2) and via its output it supplies the value P in the form of a digital code to a sequential filter circuit 4, which in response to the simultaneous occurrence of the detection signal Cd and a pulse of the clock signal Cs derives a new value for Q from the code P in conformity with relationship (4) and applies a code for Q to a computing circuit 5, which in response to a pulse of the clock signal computes the next value for R in conformity with the relationships (3) and supplies this to the difference circuit 3.

Figure 6:
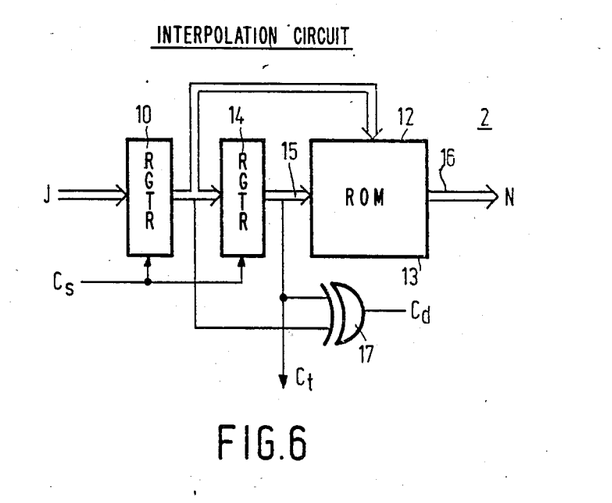
FIGS. 6 to 9 show parts of the apparatus embodying the invention in more detail.

FIG. 6 shows an interpolation circuit in more detail. The interpolation circuit 2 comprises a first parallel-in parallel-out register 10 to whose data inputs the codes for the samples J are applied and to whose clock input the clock signal Cs is applied. The data outputs of the register 10 are coupled to address inputs 12 of a read-only memory 13 (ROM) and to the data inputs of a second parallel-in parallel-out register 14 which is also controlled by the clock signal Cs. The data outputs of the register 14 are coupled to the address inputs 15 of the memory 13. In response to pulses of the clock signal Cs the codes for the successive samples J are loaded into the register 10 and are subsequently loaded into the register 14 with a delay corresponding to one clock pulse, so that always the codes of two successive samples J are available. The codes of the two successive samples determine an adress in the memory 13, which memory stores the corresponding value for N in a code for each combination of codes representing two samples situated on opposite sides of the detection level Vref, said code being available via output 16.

The most significant bits of the codes stored in the registers 10 and 14 indicate the sign of the value of the samples J. The most significant bits of the two codes are applied to an exclusive-OR gate 17 which supplies a signal Cd if the applied most significant bits are of different signas, which means that the transmission signal Vt has crossed the detection level between the sampling instants corresponding to the codes. Moreover, a signal CT is supplied which signal represents the most significant bit of the sample stored in the register 14 and, consequently, the sign of the penultimate sample applied.

Figure 7:
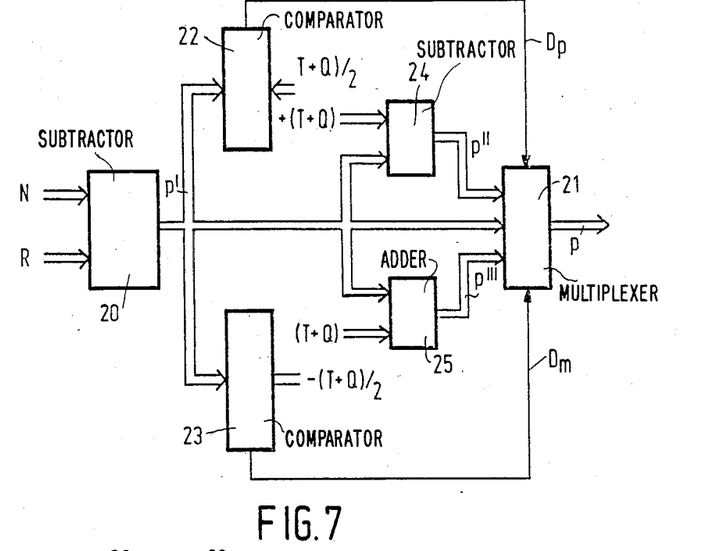

FIG. 7 shows an exmaple of the difference circuit 3 in detail. The difference circuit 3 comprises a digital subtractor circuit 20 for determining the difference P' between N and R. The output signal of the subtractor circuit 20 is applied to a first comparison circuit 22, a second comparison circuit 23, a subtractor circuit 24, an adder circuit 25, and a multiplex circuit 21. The comparison circuit 22 compares the code for P' on the first inputs with a code for $\frac{1}{2}L=(T+Q)/2$ and generates a detection signal Dp if P' is larger than the value (T+Q)/2 of the code applied to the second input. The code for (T+Q)/2 together with the codes for −(T+Q)/2 and (T+Q) is derived from the code for Q and T by means of customary digital circuits (not shown).

The comparison circuit 23 generates a detection signal Dm if P' is smaller than $-\frac{1}{2}L = -(T+Q)/2$. The subtractor circuit 24 derives a code for the value P" $(=P'-(T+Q))$ from the codes for $(T+Q)$ and P'. In a corresponding manner the adder circuit derives a code for the value P''' $(=P'+(T+Q))$ from the codes for $(T+Q)$ and P'. The codes for P" and P''' are also applied to the multiplex circuit 21. Depending on the detection signals Dp and Dm the multiplex circuit 21 always transfers that code of the codes P' P"and P''' applied to the inputs which represents a value situated between $(T+Q)/2$ and $-(T+Q)/2$.

Figure 8:
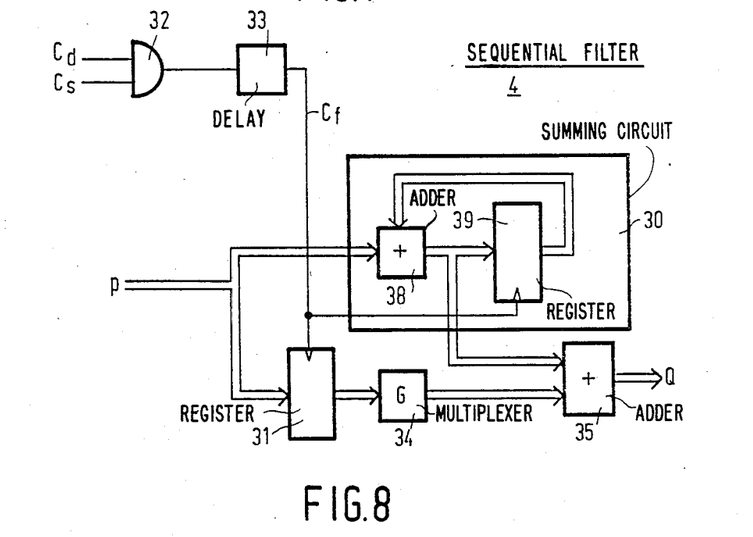

FIG. 8 shows and exmaple of a seqeuential filter circuit 4. The filter circuit 4 comprises a summing circuit 30 and a parallel-in parallel-out register 31, whose input receives the code of the value of P. The summing circuit is of a customery type comprising an adder circuit 38 and a parallel-in parallel-out register 39. The circuits 30 and 31 are controlled by a control signal Cf which by means of an AND-gate 32 and a delay circuit 33 is derived from the ssytem clock signal Cs and the signal Cd which indicates detection of a detection level crossing, so that in response to a detection-level crossing the summing circuit 30 adds the value of P to the sum value IN already present in the summing circuit. Moreover, the code for the new value of P is loaded into register 31. The code of the value for P stored in register 31 is applied to an adder circuit 35 via a multiplier circuit 34. The code for the sum value IN is also applied to an adder circuit 35. The output of the adder circuit 35 provides a code for the corrected value of Q.

Figure 9:
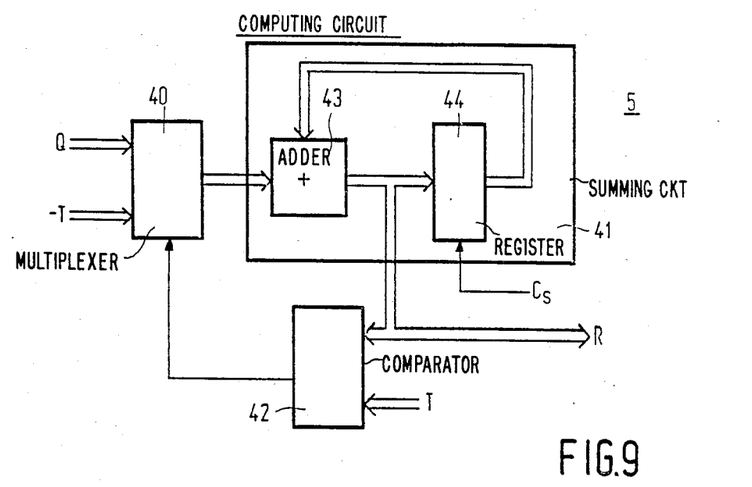

FIG. 9 shows in detail an example of a computing circuit 5. The computing circuit 5 comprises a multiplex circuit 40 to which the code for Q from the filter circuit 4 and a code for the value $-T$ are applied. The outputs of the multiplex circuit 40 are coupled to the input of a summing circuit 41, which is response to a pulse of the system-clock signal Cs adds the value represented by the code on the inputs to a sum value R and applies a code for the value R to a comparison circuit 42. The summing circuit 41 is a customary type comprising an adder circuit 43 and a parallel-in parallel-out register 44. The comparison circuit 42 generates a detection signal Cr if R is larger than T. The multiplex circuit 40 is controlled by the detection signal Cr in such a way, that muliplex circuit 40 transfers the code for $-T$ if Cr indicates that R is larger than T and the multiplex circuit 40 transfer the code for Q if Cr indicates that R is larger than T. In this way the computing circuit 5 generates a code for the value of R in synchronism with the system-clock signal and hence in synchronism with the applied samples.

Figure 10:
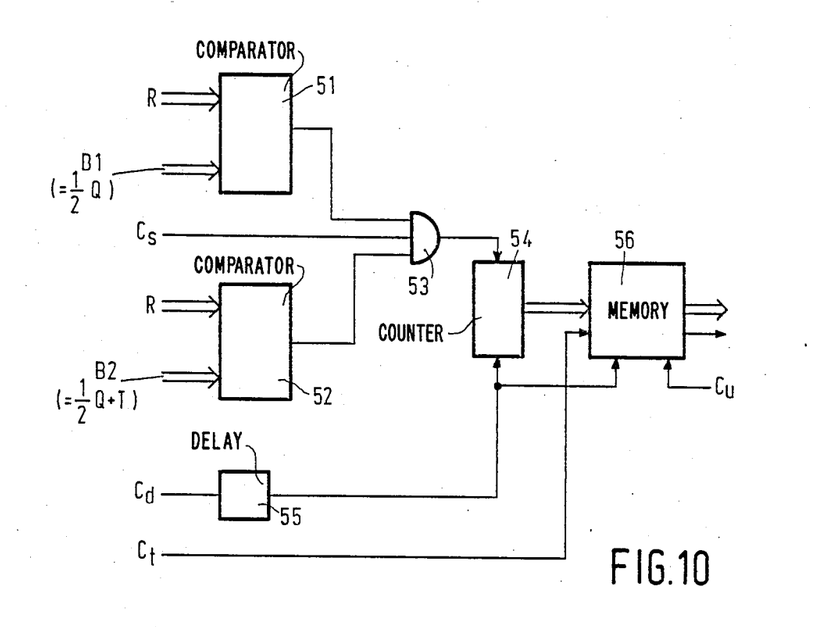
FIG. 10 shows a circuit arrangement which recovers the data transmitted by means of the transmission signal.

FIG. 10 shows an example of circuit arrangement 50 which recovers the data represented by the samples J on the basis of the successive values of the intervals R. The circuit arrangement 50 comprises a first comparison circuit 51 and a second comparison circuit 52 having an input to which the code for the intervals R are applied from the computing circuit 5 in FIG. 9. The codes for the bounds B1 and B2 are applied to the other inputs of the comparison circuits 51 and 52 respectively. As already described, $\frac{1}{2}Q$ is a suitable value for B1 and $\frac{1}{2}Q+T$ is a suitable value for B2. The codes for the bounds are derived from the codes for T and Q in a customary manner (not shown). The comparison circuit 51 is contructed in such a way that it exclusively generates a logic "1" signal if R is larger than B1. The comparison circuit 52 is constructed in such a way that it exclusively generates a logic "1" signal if R is smaller than B2. The signals generated by the circuits 51 and 52 are applied to an AND -gate 53 together with a system-clock signal Cs. The output of the AND-gate 53 is applied to the clock input of a counting circuit 54. Through a delay circuit 55 the signal Cd is applied to the reset input of the counting circuit 54 and to a control input of a memory 56 of the first-in first-out type, whose data input and data output are controlled independently from one another. The parallel outputs of the counting circuit 54, which represent the count of the counter, are applied to the data inputs of the memory 56. The signal CT generated by the interpolation circuit 2 in FIG. 6 and representing the sign of the penultimately applied sample J is also applied to a data input of the memory 56. The count of the counting circuit 54 is incremented by one each time that a pulse is generated on the output of the AND-gate 53, which pulse indicates that the value of R corresponding to an applied sample is situated within the bounds B1 and B2. In response to the pulse of the signal Cd, which pulse indicated a detectionlevel crossing, the count is loaded into the memory 56 and the counting circuit 54 is set to zero. Moreover, together with the count the sign of the penultimate sample applied to the interpolation circuit 2 is loaded into the meory 56, so that the memory 56 is successively loaded with counts representing the number of bit cells between successive detection-level crossings and with the associated signs. Under control of a signal Cu the counts and these associated signs can be read out of the memory 56 in the same sequence in which they have been loaded into the memory.

The apparatus in accordance with the present invention can be constructed entirely by means of digital elements, thus enabling the apparatus together with the circuit for processing the recovered digital data to be incorporated simply in one integrated circuit.

It is obvious that several modifications of the embodiments described are possible. For example, it is possible to construct the apparatus by means of a programmable computing circuit, such as microcomputer.

Obviously, the present invention is suitable for determining the phase positions of the channel clock at the sampling instants. However, the apparatus in accordance with the invention also furnishes information on the time difference Q between the sampling instant and the period of the channel clock. Therefore, the value of Q may also be utilized for controlling the channel-clock frequency.

What is claimed is:

1. Apparatus for the regeneration of channel-clock information from a series of samples which represent the signal values of a band-limited transmission signal at equidistant sampling instants, which transmission signal is synchronous with the channel clock, comprising:
   a. computing means for deriving initial positions of the successive sampling instants relative to reference instants defined by variable reference phase positions of a virtual reference clock, the initial position of each sampling instant being determined from the initial positions of the prior sampling instants;
   b. detection means for detecting, from the signal values of samples at the sampling instants, crossing of a detection level by the transmission signal between successive sampling instants;

c. interpolation means coupled to said detection means and responsive to level-crossings detected thereby for determining second positions of the successive sampling instants relative to such level crossings from the signal values of samples in the proximity of such level crossings;

d. means for comparing the initial and second sampling positions of said sampling instants with each other and deriving the difference there-between; and e. means for correcting the time difference between the period of the virtual reference clock and the signal sampling interval in accordance with the differences between the initial and second sampling positions determined by said comparing means;

said computing means being adapted to derive the initial positions of the sampling instants in accordance with said corrected time difference.

2. Apparatus as claimed in claim 1, characterized in that the means for correcting said time difference comprises summing means for forming the sum of the differences between the initial and second positions of each sampling instant and means for deriving said time difference from such sum.

3. Apparatus as claimed in claim 2, characterized in that the means for correcting said time difference comprises means for correcting the difference between the initial and second positions of the sampling instants by a value corresponding to the period of the virtual reference clock when such difference is larger than a value corresponding to half of the period of the virtual reference clock.

4. A device for regeneration of channel-clock information from a series of samples which represent signal values of a band-limited transmission signal (Vt) at equidistant sampling instants, which transmission signal (Vt) is synchronous with the channel clock, comprising:
   (a) means (5) for determining, according to an input value (Q), reference phase positions (R) indicative of phase positions of the sampling instants with respect to a phase of a virtual clock ($C_{ref}$), the input value (Q) corresponding to a difference between two successive reference phase positions (R),
   (b) detection means (10, 14, 17) for detecting crossings of a detection level by the transmission signal (Vt) from the samples (J),
   (c) interpolation means (12) responsive to crossings of the detection level for determining phase positions (N) of the sampling instants with respect to the phase of the channel clock from the samples (J),
   (d) means for determining a difference (P) between the phase positions (N) and the corresponding reference phase positions (R), whereby the difference (P) represents a phase difference between a detection level crossing and the phase of the virtual clock,
   (e) means (4) for adapting the input value (Q) according to the differences (P), so that the differences between the phase positions (N) and the corresponding reference phase positions (R) are substantially kept at a constant value, whereby, if the sampling frequency assumes values that are not precisely double the channel clock frequency, the channel clock information is still recovered.

5. A device as claimed in claim 4, characterized in that the means (4) for adapting the input value comprises
   (a) summing means (30) for forming the sum of the differences (P), and
   (b) means (35) for deriving the input value (Q) from at least the sum of the differences (P).

6. A device as claimed in claim 5, wherein the means (3) for determining the difference (P) comprises correction means (22, 23, 24, 25) for correcting the difference (P) by a value (T+Q) corresponding to a period of the virtual clock ($C_{ref}$) in response to a detection of a difference (P) larger than a value ((T+Q)/2) corresponding to half the period of the virtual clock ($C_{ref}$).

7. A device as claimed in calim 6, wherein the means (5) for determining the reference phase positions (R) comprises comparing means (42) for determining a second difference between a first determined reference phase position (R(k)) and a value (T) corresponding to the sampling interval, the means (5) for determining the reference phase position (R) being adapted to determine a next phase position (R(k+1)) by modifying it by the input value (Q) or a value (−T), corresponding to the sampling interval with a sign opposite to a sign of the input value (Q), according to whether the second difference determined by the said comparing means (42) is negative or positive, respectively.

8. A device as claimed in claim 5, wherein the means (5) for determining the reference phase positions (R) comprises comparing means (42) for determining a second difference between a first determined reference phase position (R(k)) and a value (T) corresponding to the sampling interval, the means (5) for determining the reference phase position (R) being adapted to determine a next phase position (R(k+1)) by modifying it by the input value (Q) or a value (−T), corresponding to the sampling interval with a sign opposite to the sign of the input value (Q), according to whether the difference determined by the said comparing means (42) is negative or positive, respecitively.

9. A device as claimed in claim 4, wherein the means (5) for determining the reference phase positions (R) comprises comparing means (42) for determining a second difference between a first determined reference phase position (R(k)) determined and a value (T) corresponding to the sampling interval, the means (5) for determining the reference phase position (R) being adapted to determine a next phase position (R(k+1)) by modifying it by the input value (Q) or a value (−T), corresponding to the sampling interval with a sign opposite to the sign of the input value (Q), according to whether the difference determined by the said comparing means (42) is negative or positive, respectively.

10. An arrangement for recovering data represented by a sampled band-limited transmission signal which is synchronous with a channel clock, comprising a device as claimed in claim 4.

11. An arrangement for recovering data as claimed in claim 10, comprising:
   (a) comparison means (51, 52) for determining whether values of the reference phase positions (R) are situated within bounds ($\frac{1}{2}$ Q; $\frac{1}{2}$ Q+T) which are situated at an interval corresponding to the sampling interval (T) from each other and
   (b) counting means (54) for counting a number of times that the reference phase positions (R) between two successive crossings of the detection level are situated within said bounds.

12. A device for synchronizing a receiver with a channel clock having a phase and a channel clock frequency, with which channel clock a received band-limited signal (Vt) is synchronized, comprising:
- a. an input for receiving a series of samples (J) which represent the received signal (Vt) at equidistant sampling instants, the sampling instants having a sampling frequency;
- b. means, responsive to an input value (Q), for determining reference phase positions (R) indicative of phase positions of the sampling instants with respect to a phase of a virtual clock ($C_{ref}$), the input value (Q) corresponding to a difference between two successive values of the reference phase positions (R);
- c. means (10, 14, 17), responsive to the samples (J), for detecting crossings of a detection level by the received signal (Vt);
- d. means (12), responsive to the crossings of the detection level and to the samples (J), for interpolating phase positions (N) of the sampling instants with respect to the phase of the channel clock;
- e. means for determining differences (P) between the phase positions (N) and the corresponding reference phase positions (R), whereby each difference (P) also represents a phase difference between a detection level crossing and the phase of the virtual clock; and
- f. means (4) for adapting the input value (Q) according to the differences (P), so that the differences (P) are kept at a substantially constant value, whereby the reference phase positions (R): represent a synchronization between the channel clock and the virtual clock; and, in conjunction, with the signal samples (J) allow recovery of data from the received signal (Vt), and whereby if the sampling frequency assumes values which are not precisely double the channel clock frequency, synchronization is still achieved.

* * * * *